United States Patent
Camp et al.

(10) Patent No.: US 6,317,729 B1
(45) Date of Patent: Nov. 13, 2001

(54) METHOD FOR CERTIFYING DELIVERY OF SECURE ELECTRONIC TRANSACTIONS

(76) Inventors: Linda J. Camp, 36 Park Avenue Extension, Arlington, MA (US) 02174; Marvin Sirbu, 1050 Devon Rd., Pittsburgh, PA (US) 15213

(*) Notice: Subject to any disclaimer, the term of this patent is extended or adjusted under 35 U.S.C. 154(b) by 0 days.

(21) Appl. No.: 09/055,975

(22) Filed: Apr. 7, 1998

Related U.S. Application Data (60) Provisional application No. 60/042,813, filed on Apr. 8, 1997.

(51) Int. Cl.[7] .................................................. G06F 17/60
(52) U.S. Cl. ............................... 705/79; 705/26; 705/16
(58) Field of Search .......................... 705/1, 39, 53, 705/69, 16, 26, 76, 79, 64

(56) References Cited

U.S. PATENT DOCUMENTS

| | | | |
|---|---|---|---|
| 5,671,279 | * | 9/1997 | Elgamal ................................ 705/79 |
| 5,745,574 | * | 4/1998 | Muftic ................................. 713/157 |
| 5,809,144 | | 9/1998 | Sirbu et al. ........................... 705/53 |
| 5,812,668 | * | 9/1998 | Weber ................................... 705/79 |
| 5,889,863 | * | 3/1999 | Weber ................................... 705/76 |
| 5,996,076 | * | 11/1999 | Rowney et al. ..................... 713/201 |
| 6,002,767 | * | 12/1999 | Kramer ................................. 705/79 |
| 6,029,150 | * | 2/2000 | Kravitz ................................. 705/39 |
| 6,076,078 | * | 6/2000 | Camp et al. ......................... 705/65 |
| 6,163,772 | * | 12/2000 | Kramer ................................. 705/79 |
| 6,178,409 | * | 1/2001 | Weber et al. ........................ 705/79 |

FOREIGN PATENT DOCUMENTS 11-96258 * 4/1999 (JP).

OTHER PUBLICATIONS

Balas, Janet; On–line help for Macintosh users; Feb. 1988; Small Computers in Libraries, v8 n2, p 10(4), DialogWeb copy pp. 1–5.*

(DRAFT for public comment) Secure Electronic Transaction "Book 1: Business Description", Feb. 23, 1996, pp. i–iii and 1–67.

(DRAFT for public comment) Secure Electronic Transactions "Book 2: Technical Specification", Feb. 23, 1996, pp. i–v and 1–269.

* cited by examiner

Primary Examiner—James P. Trammell
Assistant Examiner—Thomas A. Dixon
(74) Attorney, Agent, or Firm—Dorsey & Whitney LLP (57) ABSTRACT

A method of purchasing goods with electronic money includes encrypting information goods, incorporating the key in merchant data, and sending encrypted signed goods to a customer. The method further includes hashing the encrypted signed data to form hashed data, forming a purchase order that includes the encrypted signed data and the hashed data, and sending the purchase order from a customer to a merchant. The method further includes forming an authorization request message by combining the purchase order with the key, and sending the authorization request message from the merchant to a bank. Key delivery and payment verification are linked. The method further includes preparing payment verification data to include the key, and sending customer payment verification data from the bank to one of a dedicated key server or a certificate server. The method is compatible with SET and proves that certified delivery is possible within the SET framework.

27 Claims, 2 Drawing Sheets

METHOD FOR CERTIFYING DELIVERY OF SECURE ELECTRONIC TRANSACTIONS

Priority benefit of the Apr. 8, 1997 filing date of U.S. provisional application serial No. 60/042,813 is claimed.

BACKGROUND OF THE INVENTION

1. Field of the Invention

The present invention relates to electronic commerce. Particularly, the invention relates to purchasing goods using electronic money. Specifically, this invention brings the highest degree of atomicity to the proposed standard for electronic commerce, the Secure Electronic Transactions standard.

2. Description of Related Art

Electronic commerce includes sending electronic payments over a public network to obtain electronic goods or promises of the delivery of physical goods. Important standards have been proposed in a draft for public comment, *Secure Electronic Transactions,* 67 page Book 1 and 269 page Book 2, by VISA® and MasterCard®, Feb. 23, 1996, incorporated herein by reference. Crucial questions in such purchases are: What can customers, merchants, and banks lose on the Internet? Whom must they trust? And who takes the risks?

Answers to these questions vary across the multitude of proposed protocols for electronic commerce on the Internet. However, an examination of a broad range of these protocols makes clear that in electronic commerce, customers can lose their money if transactions are not both reliable and secure. Reliability requires atomicity in the Newtonian sense: transactions must fail completely or succeed completely. The traditional technique for achieving atomicity is rollback, where steps are reversed until the most recent consistent state is reached. For example, if a customer's attempt to transfer funds from checking to savings fails, funds withdrawn from the customer's checking account are placed back into the customer's checking account. If money cannot be returned in an aborted transaction, then it is destroyed, lost, stolen, or duplicated. Transactions in which money is destroyed, lost, stolen, or duplicated are not reliable.

Before I describe my invention more completely, a consideration of two fundamental questions is in order: Why are liable transactions important? And, what are the properties of a reliable electronic commerce protocol? To answer these questions, I must first address a more basic issue: What is money? Defined by its three elemental functions, money is a store of value, a standard of value, and a medium of exchange. Ensuring that electronic commerce maintains money's functions as store and standard of value is not difficult. In contrast, ensuring that electronic commerce maintains money's function as a medium of exchange is difficult. Money as a medium of exchange requires reliability in transactions, and providing transactional reliability in electronic commerce is not trivial.

Money as a medium of exchange requires special transactional properties. As a medium of exchange, money must have transactional durability; that is, money must be conserved in transactions, not created or destroyed. Money transactions must be consistent; the amount received by the seller must be the same amount paid by the buyer, with no change in that amount occurring during the transaction.

The transactional properties that enable money to serve as a medium of exchange amount to transational reliability. And therein lies the answer to my initial question: why are reliable transactions important? Reliable transactions in electronic commerce are important because they are necessary to the proper functioning of electronic money as a medium of exchange.

There remains, then, the second question: what are the properties of a reliable electronic commerce protocol? The study of distributed data bases has defined the characteristics of reliable data bases transactions as atomicity, consistency, isolation and durability. These are known as the ACID properties.

Physical transfers of money illustrate the ACID properties of a reliable transaction. ACID properties are innate in exchanges of physical money. Please note that during this, and all future analyses, I take advantage of gender—specific language to simplify my discussion. The customer is assumed female; the merchant male; and the bank neuter. This allows me to use she, he and it without worrying that the reader may confuse the noun referenced by the pronoun.

Consider a customer's handing a dollar bill directly to a merchant. This transaction maintains atomicity: The dollar bill will not be lost as it leaves the customer's hand and is transferred to the merchant. There is always exactly one dollar; it is never duplicated or destroyed. If the dollar is dropped, then the customer can pick it up and return the transaction to its previous state. This simple physical safeguards does not necessarily hold in an electronic transaction.

In electronic commerce, payment message must travel over an open network, that is not secure, from the customer to the merchant. Without verifiable acknowledgment in the protocol, the customer will not know that the merchant received the payment message. Under the widely used transmission control protocol (rCP), a payment may be duplicated when the communications protocol believes the packet containing the payment message may be destroyed by network failure. If a payment message is lost, delayed, or destroyed, confusion rather than consistency may result.

In sum, transactional reliability is not a trivial matter in electronic commerce. Thus, the provision of highly reliable transactions is a critical research issue in the analysis of electronic commerce protocols, and one I undertake in this invention.

There are three classes of atomicity: money atomicity, goods atomicity and certified delivery.

Of course, electronic transactions may have no atomicity. No atomicity requires mutual trust among participants. The physical equivalent is sending cash or goods in the mail to a post office box. Customer or merchant fraud can be simple in systems with no atomicity.

Electronic transactions may have money atomicity. The physical equivalent is paying cash. In money-atomic systems there is no mechanism for certification of merchandise delivery. If used for remote purchase with accepted techniques for the delivery of physical goods, money atomicity is quite adequate. But fraud, through a customer's theft of goods or a merchant's refusal to deliver goods after payment, can be trivial when systems with only money atomicity are used for goods with on-line delivery, such as software. Secure Electronic Transactions has money atomicity (MasterCard, 1996).

Electronic transactions may have money atomicity. Goods atomicity is the equivalent of Collect on Delivery. The merchant is not paid unless there is a delivery. The customer does not pay unless there is a delivery.

Finally, electronic commerce systems may provide certified delivery. With certified delivery the customer only pays if the item delivered matches the description of the item promised. The merchant is only paid if the item delivered matches the description previously agreed upon by the merchant and customer. Certified delivery applies only to information goods—however a receipt, invoice or purchase order are all special cases of information goods.

In this invention we extend SET to include certified delivery.

In this disclosure, hash functions are functions that given the output it is difficult to determine the input. With a hash function information is mathematically transformed so that it can be used for verification but not read. That is to say, with a hash function, information can be verified without being known. The output of a hash function is typically much smaller than the input.

Hashing is distinct from secret key or symmetric encryption. With secret key encryption a single key encrypts and decrypts information. Without the key nothing can be known or verified; with the key the encrypted information can be decrypted, read, and verified as having not been tampered with during transmission. DES is a known encryption technique that encrypts data according to a key, and triple DES is a three times application of the DES algorithm that uses three keys in succession.

Public key encryption is a technique where two keys are generated: a public key and a private key. Data encrypted under the private key can only be decrypted with the public key, and vice versa. Usually, the private key is kept secret by a party, and the public key is published to all by a trusted source. A party receiving private key encrypted data may obtain the corresponding public key from the trusted source, and then decrypt the data.

Signing, related to encryption, is any known technique by which data is digitally signed so that it can be trusted to have come from the party signing the data. For example, a signing party may encrypt data under its private key. Any person decrypting the data under the corresponding public key will know the identity of the signing party to the confidence that the trusted source has verified the identity of the public key owner. Any person who decrypts the data can also be certain that it has not been altered by any but the owner of the corresponding private key.

SUMMARY OF THE INVENTION

SET offers multiple protocols for electronic commerce which reflect the different types of Internet access available. Transactions are possible for customers with e_mail connectivity and Web connectivity. Transactions can be implemented by customers with or without certificates. Here, I consider transactions when a customer has public key certificates and Web access.

The principal SET message types are shown in Table 1, and their field descriptions are shown in Table 2. Field or variables are named as in the SET Technical Specification, except m the cases where full descriptions have been included instead of field names. For example, sequence #1 is a full description of a field rather than a proper name.

An alternative version assumes only that customers can calculate hash values of payment information. This protects payment information from merchants. However, this version of the protocols does not prevent replay attacks once credit card information is obtained.

This invention is compatible with SET implementations which require that the merchant and customer both have associated public keys.

This invention includes both two-sided certified delivery and one-sided certified delivery for SET. This invention illustrates that it is possible to maintain consistency with the SET standard and provide the highest level of atomicity.

In other published work, the variations of certified delivery show that the elements of certified delivery can be separated. Table 1 describes the message types involved in a SET transation.

TABLE 1

Messages in a SET Transaction

| Message | Name | Contents |
|---|---|---|
| 1.C->M | PInitReq | LID-C, Chall-C, BrandID, Thumbs |
| 2.M->C | PInitRes | S-M{TransID, PinitDate, Chall-C, Chall-M, certs} |
| 3:C->M | PReq | OI, PI |
| 4:M->C | PRes | S-M{TransID, Chall-C, Completion Code, [Results]} |
| 5:M->B | AuthReq | E-G{S-M {TransID, AuthReqDate, H(OIData), H{(OD, PurchAmt, ODSalt)}, PI, [Mthumbs], AuthReqpayload} |
| 6:B->M | AuthRes | EX-M({SO-G(AuthResorSlae,[PANBack], AuthResorSale}, [PANBack]) AuthRes |
| 7:C->M | InqReq | TransID, Chall-C2, S-C(TransID, Chall-C2) |
| 8:M->C | InqRes | S-M{TransID, Chall-C2, CompletionCode, [capture code and capture ratio if capture has occurred]} |
| 9:M->B | CapReq | E-G(S-M({CapRRPID, CapDate, CapSeq})) |
| 10:B->M | CapRes | E-M(S-G({CapRRPID, CapSeq, [DraftCapture Status]})) |

Table 2 describes the content of fields used in SET messages.

TABLE 2

Fields used in an SET Transaction

| Variable | Description |
|---|---|
| LID-C | customer's or local transaction identifier |
| XXXnonce | random number associated with message or message set XXX (e.g. Authnonce) |
| TransID | transaction identifier for merchant and customer |
| Chall-M, Chall-C, Chall-C2, XXNone | random numbers |
| BrandID | brand of card |
| [Thumbs] | thumbprints, attesting to key/identity/attribute matching |
| XXXDate | date message XXX is initiated |
| Certs | certificates attesting to key/key purpose/identity matching |
| OI | Order Instruction |
| OIData | TransID, Chall-C, PreqDate, ODSalt, Chall-M |

TABLE 2-continued

Fields used in an SET Transaction

| Variable | Description |
| --- | --- |
| OP | Payment Instruction: EX-G({TransID, Inputs, <DualSig, H(OIData)}$_{DES}$ {Account #, Card Exp., PAN nonce)$_{STRONG\ ENCRYPT}$ PINnonce, H(TransID, Inputs, {DualSig, H(OData)) |
| Inputs | H({OD, PurchAmt, ODSalt}) PurchAmt |
| OD | Order Description |
| OD Salt | H(OD nonce, Purchase amount) |
| DualSig | {SO-e H(OIData)}, H(OIData) XOR H(PIData) |
| PIData | {TransID, Inputs, Account #, Card Expiry, PANnonce}$_{STRONG\ ENCRYPT}$ |
| Completion Code | Status of the transaction |
| AuthAmt | amount requested by merchant in authorization exchange |
| Results | either the authorization code and the difference between the authorized amount & the purchase amount, or the capture code and the ratio of capture amount to the purchase amount. |
| AuthReqPayload | AuthAmt, MerchCatCode, MerchGroup, MerchGroup, MerchSpecData, Cardholder Billing address, Boolean requesting capture, merchant-assigned batch ID, fields for batched transactions, PPI |
| MarketSpecData | industry identifier, ex. hotel, auto, . . . |
| Duration | number of days for which a transaction can be open |
| AuthRes | EX-M({SO-G(AuthResorSale,[PANBack])Authresorsale} [PANBack]) |
| AuthResorSale | TransID, AuthDate, ResponseData, <AuthResPayload or SaleResPayload> |
| PANBack | pseudonymous account number, card expiration, AuthNonce |
| PPI | prestigious property indicator, used to identify a prestigious property floor limit |
| ResponseData | code indicating outcome (RespCode), for authorization: authorization code (AuthCode, ValidationCode, validation code for authorization messages, verification of customer address (AVSResult), identifier to match authorization & clearing (LogRefID), MarketSpecData, for capture: CapToken |
| CapRRPID | unique identifier for response/request pair |
| CapPayload | {CapReqAmt, [BatchID], SaleDetail, responseData, [SeqNumCount] AuthAmt} |
| CapSeq | index number if an array of purchases are being captured and for each item TransID, CapPayload |
| BatchID | draft capture batch to which this transaction will be |
| SaleDetail | {[PurchaseCardData, SaleDate,[PayRecurInd], [MerOrderNum, [PassengerTransport OR Lodging Desc OR CarRental Desc as appropriate] |
| PurchaseCardData | description of items associated with this capture item |
| PayRecurInd | indicates type of transaction |
| MerOrderNum | merchant order number |
| PassengerTransport OR LodgingDesc OR CarRentalDesc | description of itinerary or lodging charges or car rental charges as appropriate, depending on MarketSpecData |
| CapToken | E-G(S-G{TokenNonce, AuthAmt, Tokenopaque}) |
| SaleDate | date for completing sale/shipping date |
| SeqNumTot | total items in the sequence, present if applicable |

The following must be true for certified delivery:

1) customer can prove the merchant promised goods with a specific description for a given price;
2) customer can prove that the merchant delivered a particular bitstream; and
3) customer can obtain the key without merchant cooperation to complete a transaction by decrypting the bitstream into the item requested.

With two-sided certified delivery the burden of proof can fall on the merchant. Two-sided certified delivery requires:

1) the merchant can prove the customer ordered certain goods;
2) the merchant can prove that the customer accepted a given bitstream as delivered;
3) customer can prove that the merchant delivered a particular bitstream;
4) customer can obtain the key without merchant cooperation to complete a transaction by decrypting the bitstream into the time requested; and
5) merchant or trusted entity can prove that the merchant has delivered the key which decrypts the bitstream into the requested goods.

There are multiple ways to provide certified delivery within the SET framework. The addition of multiple messages makes achieving certified delivery trivial when following the teachings of this invention. The following specific description shows one way to achieve certified delivery in SET. This specification is illustrative not exclusive. The present embodiment illustrates that SET can provide certified delivery, and that this is possible with minimal alterations.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
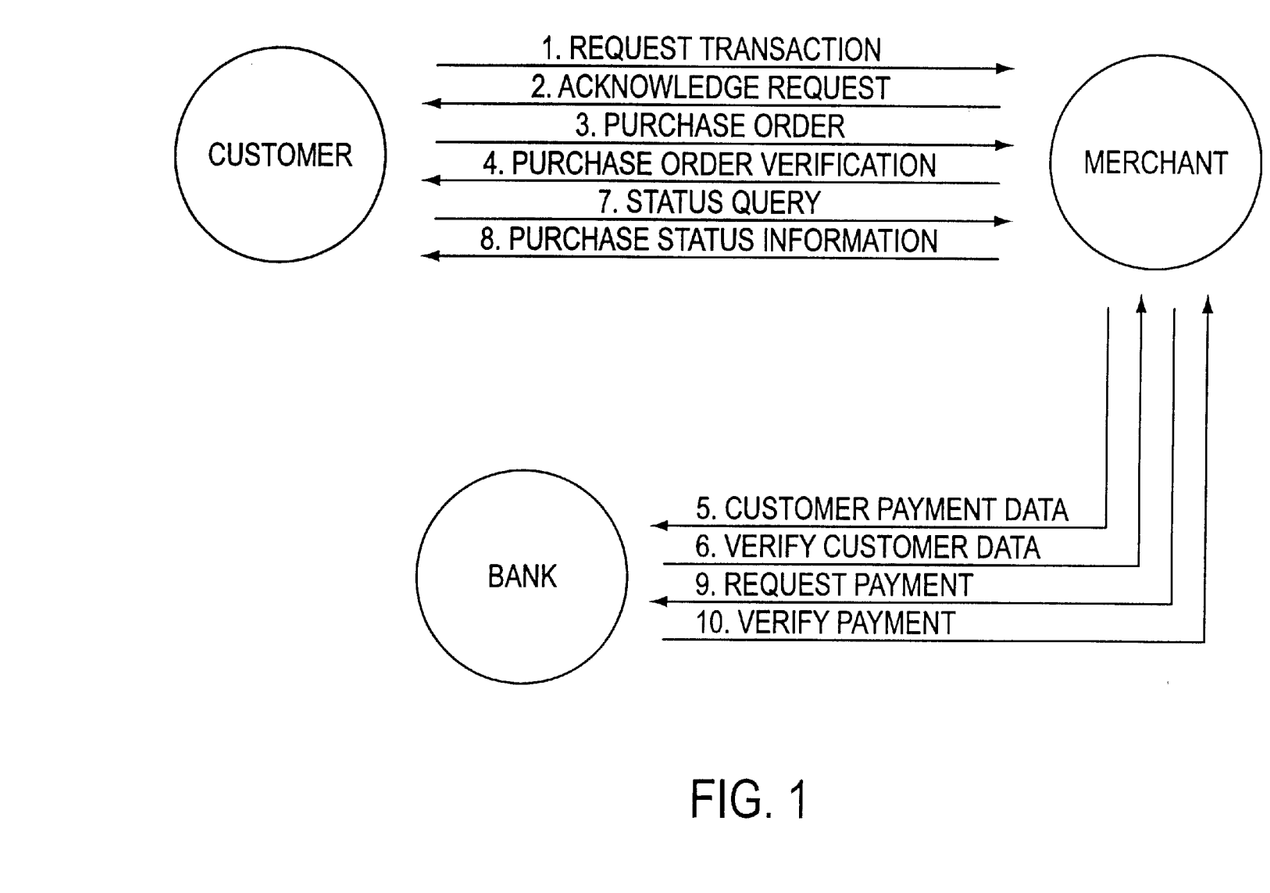
FIG. 1 is a functional block diagram of a secure electronic transaction without certified delivery showing the interchange of messsges between entities of the transaction.

In SET, the standard language in the credit card industry is used. Credit card verification is referred to as authorization and payment is referred to as capture. Since the words authorization and capture have other, specific meanings in computer security I will use the terms verification and payment. The bank as shown in FIG. 1, is an acquirer gateway, a service provider for acquirer banks. That is, the gateway is the bank's Internet presence. With these changes in terminology, FIG. 1 corresponds to the description in the SET specifications.

Since SET specifications permit batching, the contents of a specific message may vary slightly from the single transaction model shown here. In fact, steps five, six, nine and ten can precede steps four, seven and eight. The extension of certified delivery in a batched technique is a trivial extension of this detailed description.

Each description of a message that follows FIG. 1 includes the name of the message in the SET protocol in order to simple farther exploration of the SET Technical Specifications for the reader. These messages may be in different order in the case of batching, but the additional information necessary for certified delivery remains unchanged. In addition, corresponding names for variable descriptions are given in parentheses.

A transaction using the SET protocol for an interactive medium is shown in FIG. 1. Notice that browsing and price negotiation are not included in the SET protocol. A corresponding diagram can be found on page 133 of the SET Technical Specifications.

In the first message (PInitReq), the customer identifies her desire to make a purchase. This message includes a customer-specific message identifier (LID-C), a corresponding once (Chall-C), the customer selected payment method (BrandID) and a list of public key certificates with the appropriate hashes for verification. The hashed public key certificates are called thumbprints (Thumbs). After this step, the merchant knows the customer's identity, the item requested and the price.

In the second message (PInitRes) the merchant acknowledges the customer's request to begin a transaction. The merchant begins a record which includes the customer's transaction identifier (LID-C) and brand (BrandID) in the data bases. Presumably, the customer's address (for responses) is also included, although this is not noted in the specifications. According to the SET documentation, the customer's address is supposed to be obtained out of band by the merchant. Thus, the message which contains this information is not specified. The merchant will know the customer's credit card type, limits on the customer's account, and any customer attributes implied by this credit information. The merchant must know the customer's billing address for authorization. Although the method for obtaining that information is not specified, the data are reasonably included as part of the information exchange in SET.

The second message (PInitRes) includes the transaction identifier (TransID) to be used by all three parties, a corresponding challenge (Chall-C), a time stamp (PInitDate), a new challenge from merchant to customer (Chall-M), and public key certificates and thumbprints (certs). After this message the customer has the merchant's certificate.

The third message (PReq) is the customer's purchase request. This is the customer's conditional commitment to completing the transaction. Note that the customer is not committed, and the payment is not durable, for some weeks. The customer maintains the right of refusal until after she reviews her monthly credit card charge account summary.

The purchase request includes payment information (PI) and order information (OI). The payment information is encrypted so that the merchant cannot read it, but the bank can. A hash of the order information is included in the signed message. The order information and purchase amount (part of the PI) themselves are sent in verifiable but unreadable form (i.e., they are hashed). This message is signed by the customer, and includes a general description of goods, amount, and nonces in the clear. The payment information includes account number, transaction identifier, amount and card expiration date encrypted for the bank. Additional order information including customer billing address is obtained by the merchant external to the protocol.

The fourth message (PRes) is sent from the merchant to the customer. Note that the merchant may choose to obtain authorization, or to respond to the customer immediately and batch authorization. Here we have assumed the former. If it were the later, the merchant would send the results of his attempt to obtain authorization.

The fourth message (PRes) is the merchant's indication to the customer that the merchant will complete the transation, contingent on authorization, and possible capture. This message is signed by the merchant (S-M). It includes the transaction identifier (TransID), the customer's transaction identifier (Chall-C), and a flag indicating the status. of the transaction (Completion Code).

If authorization had been completed previously, then the results would show authorization status (AuthCode) and authorization amount (AuthAmt). If the transfer of funds, called capture, had been completed, the capture status, capture amount, and the ratio of amount captured to purchase price would be included.

The fifth message is the authorization request (AuthReq) from the merchant to the bank. Recall that what we refer to as the bank here is actually a gateway to the credit clearance system. This message is encrypted so that the bank can read it (E-G). The message is signed (S-M) for verification, then encrypted (E-G) using a one-time DES key. The DES key itself is then encrypted in the bank's public key. The same technique is used for the capture message to and from the bank (CapReq, CapRes).

The authorization request (AuthReq) includes transaction-specific and merchant-specific data. Transaction-specific data are the transaction identifier (TransID), the date (AuthReqDate), and a hash of the order information (OIData). Recall the order information data (OIData) was used in the purchase request (Preq). The order description (OD), the amount (PurchAmt), and nonce (ODSalt) are hashed together and included.

The transaction identifier (TransID), the customer's transaction identifier (Chall-C), the date, merchant identifyWing information and the brand identifier are hashed together for inclusion.

The merchant-generated data are the amount (CapAmt), the merchants' business area MerchGroup), associated data (AuthReqPayload) and the customer's address (AddressVerificationData) and a single letter identifying a specific purchase area. This single letter is referred to as the MarketSpecData and identifies the industry—hotel, auto, etc. This payload also includes an option for requesting additional authorization, above the purchase amount, called AdditionalAmount. This option explains why the amount authorized (AuthAmt) differs from the amount paid (CapAmt). There is an identifier the message as part of a batch (BatchID), and fields for associated batch information (in SaleReqData). SaleReqData are BatchID and sale information (SaleDetail) for each item. The sale information (SaleDetail) includes a desetiption of the item (PurchaseCardData), the shipping data (SaleDate), one byte to identify the transaction type (PayRecurdInd), the merchant's order number (MerOrderNum) and item descriptions as appropriate (depending on MarketSpecData). There is a flag to identify properties with a floor price (PPI) and merchant thumbprints (MThumbs).

The sixth message is the authorization response (AuthRes) of the bank to the merchant. Before responding the bank verifies the signature and verifies signatures of the hash values signed by the customer and sent by the merchant match. The authorization response is encrypted with "extra-strong" encryption (EX-M). This message is signed by the bank as such:

(SO-G). EX-M({SO-G(AuthResorSlae, [PANBack], AuthResorSale}, [PANBack]) AuthRes

The sixth message includes the transaction identifier (TransID), the date (AuthDate), and appropriate response data (ResponseData), as well as supporting information as appropriate (AuthResPayload). The response data are a code indicating outcome (RespCode), an authorization code (AuthCode) a validation code (ValidationCode), verification of customer address (AVSResult), an identifier to match the authorization with clearing (LogRefID), and finally the MarketSpecData.

In step seven (InqReq) the customer may inquire of the merchant to determine the status of the transaction. The customer generates a second challenge (Chall-C2). Only the transaction identifier (TransID) and the customer's second transaction identifier (Chall-C2) are included in this message; however, a signed version (S-C) of this information is appended to the customer inquiry.

In step eight the merchant responds (InqRes) to the customer with a signed message (S-M) of the same form as message four (InqReq). That is, the merchant reiterates his commitment to complete the transaction and notifies the customer of the authorization status.

In step nine the merchant requests capture from the bank (CapReq). Capture follows authorization. In authorization a certain amount is reserved on the credit line of the customer. In capture, a lesser or equal amount is transferred to the merchant. The capture messages (CapReq, CapRes) are both signed (e.g., S-M or S-G) and encrypted (e.g., E-G or E-M) using a one-time DES key, which is then protected using the recipient's public key. The capture request includes a globally unique identifier (CapRRPID), the date (CapDate), and an index number if there is a set of items (CapSeq). For each item in the sequence there is associated information (CapPayload). This associated information (CapPayload) includes the requested amount (CapReqAmt) as well as (in SaleDetail) the description of the purchase (PurchaseCardData), the date (SaleDate), identifier for the transaction type (PayRecurInd), the merchant order number (MerOrderNum), and appropriate details depending on MarketSpecData. Additional information (ResponseData) are a nonce (CapNonce), an amount (AuthAmt), and a flag (TokenOpaque). This message is the merchant's commitment to the bank to complete the transaction.

In step ten (CapReq) the bank confirms capture. The gateway returns the information in the capture request (CapReq) except the date, and adds a draft capture status.

Consider the transactional characteristics of SET.

The SET protocol provides money atomicity, but does not provide either goods atomicity or certified delivery. The SET protocol could be strengthened by the addition of certified delivery for information goods.

Figure 2:
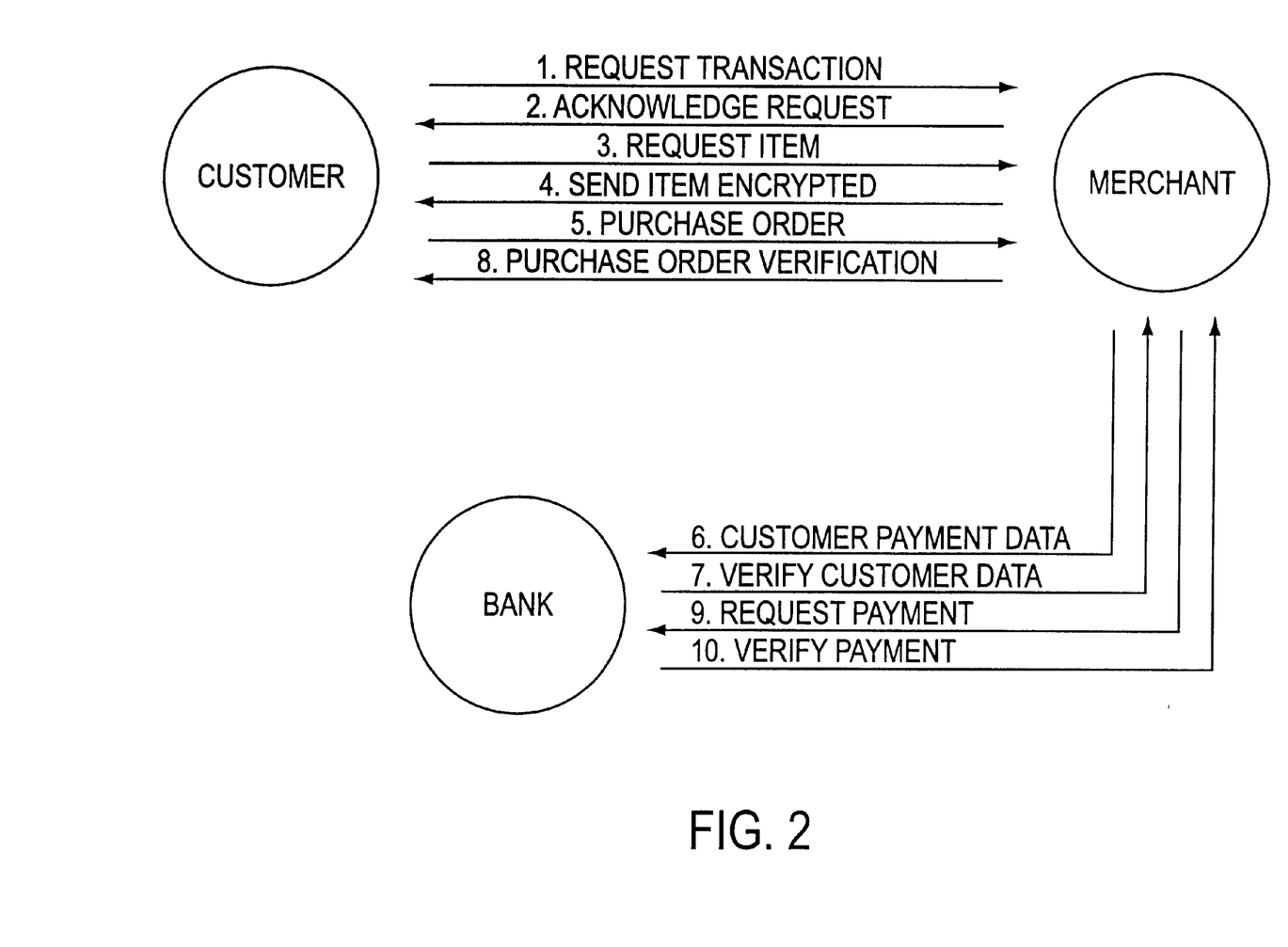
FIG. 2 is a functional block diagram of a secure electronic transaction with certified delivery showing the interchange of messages between entities of the transaction.

In a preferred embodiment, a technique is provided for providing certified delivery; certified delivery could be added in other ways. This could be done by adding a message where the information is delivered encrypted, and then adding the appropriate fields. The following paragraphs describe the changes necessary to provide certified delivery for SET purchases. The additional messages, three and four, are shown in FIG. 2 and Table 3.

TABLE 3

Message in a SET Transaction with Certified Delivery

| Message | Identifier |
|---|---|
| 1:C->M | PInitReq |
| 2:M->C | PInitRes |
| 3:C->M | S-C {TransID, Chall-C, Chall-M, item requested, OD} |
| 4:M->C | S-M {TransID, H(Ek(item))}, Ek(item, OD, Chall-C, Chall-M} |
| 5:C->M | PReq |
| 6:M->B | AuthReq |
| 7:B->M | AuthRes |
| 8:M->C | PRes |
| 9:M->B | CapReq |
| 10:B->M | CapRes |

The additional messages are shown in boldface. Alterations to fields in other messages are described in the preceding text.

Of course, there are several possible ways to add certified delivery to SET. For example, one could add fields to the initial two steps so that the merchant responds immediately to the customer's request. However, the fields in the SET protocol are clearly specified and there is an acceptance in the protocol for information to be received external to the protocol. Thus the addition of a new message and the alteration of the fields appears to be a preferable choice Simply adding fields may be an obvious extension, but integrating certified delivery into SET is not.

One significant aspect in the preferred embodiment shown here is that the purchase order verification (PRes) must follow the authorization messages (AuthReq and AuthRes).

Between the order request (PInitReq) and order information (PReq) the merchant must select the item the customer wants, encrypt it, and send it. This is the purpose of the two messages.

The delivery of the encrypted merchandise is an additional step required for certified delivery. This may be transparent or external to the SET protocol. SET has other transparent messages sent, for example customer address information is deliver to the merchant external to the protocol.

After the second message the transaction ID has been established. The customer needs to send a message with the item requested. This message must include the item ordered and the price.

The merchant would send the item encrypted with some key, k. This message must be signed and encrypted. The message must be signed for purposes of nonrepudiation. The message would be as follows, in the SET format: S-M {TransID, H(Ek(item))}, Ek(item). Ek denotes encrypted under key k, and H denotes hashed according to a predetermined algorithm. Thus, the merchant would have signed a commitment to deliver an item with a specific description, acknowledgment of having delivered a specific bitstream, and that this encrypted bitstream is in fact the promised, encrypted with the key, k.

The customer will have the encrypted merchandise when building the purchase order (PReq). (Step five in FIG. 2; Step three in FIG. 1.) The customer already has the merchant's signature on a description of the item and the price as described under Table 3. The customer would also include a hash of the encrypted item sent by the merchant. The order description field (OD) can be expanded to include this hash value. After this step, in addition to the information discussed above, the merchant has nonrepudiation from the customer that the bitstream was received.

The merchant may then ask for authorization (AuthReq). This message must be altered to identify the transaction as information-based and include the key. The next paragraphs describe the field used to enable this. The purposes of the data in this message (AuthReq) are to provide the bank with the key to the merchandise, and the customer's verification that the merchandise has been received.

The merchant's verification of the customer's payment information in (AuthReq) must also be changed. (This is Step five in FIG. 1 and Step six in FIG. 2.) The changes are in the content of the data fields (AuthReqPayload). First, the transaction must be identified as one concerning an information good. The natural place for such a specification is the MarketSpec field in the MarketSpecData. Recall that this field identifies the industry. For certified delivery the MarketSpecData field could be I for information.

The SaleDetail is also part of the AuthReqData. SaleDetail includes information on specific transactions. The fifth field of SaleDetail is either PassengerTransport, LodgingDesc or CarRentalDec. An option for certified delivery would be to include the key in this field. If the MarketSpecData identifies the transaction as for an information good, i.e. suitable for certified delivery, then the merchant would be required to include the key to decrypt the good for the customer.

The information is structured as follows in SET:
AuthReqPaylod(MarketSpecData[MarketSpec], SaleReqData[{SaleDetail(Desc)}])

All of this is contained in the AuthReqData, which also contains the hash of the order description, the purchase amount, and a nonce. As such:

AuthReqData={TransID, AuthReqData, H(OID), H(OD, Amount, ODSalt), PI, AuthReqPayload, Thumbs}

The Authorization Request Payload (AuthReqPayload) is contained in Authorization Request Data (AuthReqData). The other field of interest in the Authorization Request Data is the order description (OD). The order description contains the hash of the item, as previously described. The order description is signed by both the merchant and the customer.

The Purchase Order Verification can include the key. (Step four in FIG. 1; Step eight in FIG. 2.) The CompletionCode can include the key if the field is sufficiently large.

This leaves one question remaining: how does the customer obtain the key if the merchant fails? Having the customer obtain the key from the acquirer gateway is one option. There are at least two other options: having a dedicated key server or providing the information through the certificate authorizing agent.

Having a dedicated key server has the advantage that the server could be widely available. It would have the disadvantage that it requires creating an entirely new entity. The dedicated key server can be administered by the gateway system, the acquiring bank, or by some third party trusted by the merchant and the customer. The keys could be made publicly readable, since the key itself, absent the merchandise, is not valuable. There is no additional threat of theft by making keys readily available.

Using the certificate server has the advantage that customers already interact with the server in question, and with the addition of a key query the certificate server can also be a key server. The certificate server has two characteristics that make it a promising alternative: it is readily available to the customer and merchant base, and it is closely connected to the acquirer gateway to verify certificate information.

Suppose that the certificate authority can service key queries. This is a much simpler message than a certificate request, or certificate renewal request. Although there is more than adequate space in the certificate request messages, a smaller key-specific query would be a reasonable addition.

The merchant must have selected a certificate server in order to complete a transaction. The customer can prove that the merchant selected a particular certificate server by presenting the merchant's credentials. Thus a customer can prove that a merchant did not provide a key as promised by presenting the merchant's certificate, the contract, the encrypted merchandise and a response from the appropriate certificate authority indicating that there is no corresponding key available.

Notice that this extension need not necessarily require the creation of new trusted entities. The merchant is vulnerable to fraud because the certificate authority could claim not to have the key, yet transmit the key to the customer. However, the perversion of a certificate authority would result in the ability to create apparently valid merchant and customer certificates, which has much more service consequences.

Having described preferred embodiments of a novel method of certiiying the delivery of a secure electronic transaction (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims:

What is claimed is:

1. A fault-tolerant method of purchasing a digital good compatible with the SET protocol and protocols derived from or compatible to the SET protocol in a transaction comprising steps of:

sending to a merchant from a consumer a request for delivery of the digital good at a price in a first non-SET protocol message;

sending from the merchant to the consumer a merchant-signed invoice and the digital good encrypted under a digital good encryption key in a second non-SET protocol message;

sending a SET purchase request message from the consumer to the merchant that includes an order description;

sending a SET authorization request message from the merchant to an acquirer gateway that includes the digital good encryption key and an indication that the transaction is a transaction for the digital good; and sending a message to the consumer containing the digital good encryption key.

2. The method of claim 1, wherein the step of sending a message to the consumer containing the digital good encryption key includes sending a message from the merchant.

3. The method of claim 1, wherein the step of sending a message to the consumer containing the digital good encryption key includes sending a message from a dedicated key server agent.

4. The method of claim 1, wherein the step of sending a message to the consumer containing the key includes sending a message from a certificate authorizing agent.

5. The method of claim 1 wherein the merchant-signed invoice includes a partial order description.

6. The method of claim 1 wherein the merchant-signed invoice includes a hash of the encrypted digital good.

7. The method of claim 1 further comprising a step of verifying the merchant-signed invoice by verifying that a hash taken on the received encrypted digital good matches the hash included in the merchant-signed invoice.

8. The method of claim 1 further comprising a step of initializing the transaction wherein the merchant-signed invoice includes a transaction identifier established during the step of initializing the transaction.

9. The method of claim 1 wherein the order description includes both a partial order description and a hash of the encrypted digital good.

10. The method of claim 1 further comprising a step of verifying information in the purchase request message wherein the step of verifying information in the purchase request message includes a step of verifying that a counter signature on the order description is valid.

11. The method of claim 1 additionally comprising a step of retaining records for dispute resolution that include the order description signed by both the consumer and the merchant, a hash of the encrypted digital good and a copy of the digital good encryption key at an entity for maintaining records, the entity for maintaining records including one of the acquirer gateway and an agent for the acquirer gateway.

12. The method of claim 11 further comprising a step of sending a digital good encryption key request message from the consumer to the entity for maintaining records.

13. The method of claim 12 further comprising a step of sending to the consumer, in response to a digital good encryption key request message, a key response message containing the digital good encryption key supplied by the merchant and identified as the digital good encryption key used to encrypt the digital good.

14. The method of claim 1 further comprising a step of sending a SET verify customer data message from the acquirer gateway to the merchant wherein the digital good encryption key is included in the SET verify customer data message.

15. The method of claim 1 further comprising steps of:
sending a SET capture request message from the merchant to the acquirer gateway; and
sending a SET capture response message from the acquirer gateway to the merchant wherein the key used to encrypt the digital good is contained in the SET capture response message.

16. A fault-tolerant method of purchasing a digital good compatible with the SET protocol and protocols derived from or compatible to the SET protocol in a transaction comprising steps of:

sending to a merchant from a consumer a request for delivery of the digital good at a price;

sending from the merchant to the consumer a merchant-signed invoice and the digital good encrypted under a digital good encryption key;

sending purchase request message from the consumer to the merchant that includes an order description;

sending an authorization request message from the merchant to an acquirer gateway that includes the digital good encryption key and an indication that the transaction is a transaction for the digital good, the indication that the transaction is a transaction for the digital good indicating that the transaction has the highest level of atomicity; and sending a message to the consumer containing the digital good encryption key.

17. The method of claim 16 wherein the authorization request message includes a MarketSpecData value that indicates that the transaction is for a digital good with certified delivery.

18. A fault-tolerant method of purchasing a digital good compatible with the SET protocol and protocols derived from or compatible to the SET protocol in a transaction comprising steps of:

sending to a merchant from a consumer a request for delivery of the digital good at a price;

sending from the merchant to the consumer a merchant-signed invoice and the digital good encrypted under a digital good encryption key;

sending a purchase request message from the consumer to the merchant that includes an order description;

sending an authorization request message from the merchant to an acquirer gateway that includes the digital good encryption key and an indication that the transaction is a transaction for the digital good, the authorization request message being an AuthReq message in the Secure Electronic Transactions (SET) protocol that includes the key used to encrypt the digital good; and sending a message to the consumer containing the digital good encryption key.

19. The method of claim 18 wherein a portion of a SaleDetail field in the AuthReq message includes the digital good encryption key.

20. The method of claim 18 wherein the digital good encryption key is included with a key sequence number.

21. A fault-tolerant method of purchasing a digital good compatible with the SET protocol and protocols derived from or compatible to the SET protocol in a transaction comprising steps of:

sending to a merchant from a consumer a request for delivery of the digital good at a price;

sending from the merchant to the consumer a merchant-signed invoice and the digital good encrypted under a digital good encryption key;

sending a purchase request message from the consumer to the merchant that includes an order description;

sending an authorization request message from the merchant to an acquirer gateway that includes the digital good encryption key and an indication that the transaction is a transaction for the digital good; and sending a message to the consumer containing the digital good encryption key, wherein the step of sending a message to the consumer containing the digital good encryption key includes the merchant sending a purchase order verification message in the Secure Electronic Transactions (SET) protocol that includes the digital good encryption key.

22. The method of claim 21 wherein the purchase order verification message contains the digital good encrytion key in a CompletionCode field.

23. A fault-tolerant method of purchasing a digital good compatible with the SET protocol and protocols derived from or compatible to the SET protocol in a transaction comprising steps of:

sending to a merchant from a consumer a request for delivery of the digital good at a price;

sending from the merchant to the consumer a merchant-signed invoice and the digital good encrypted under a digital good encryption key;

sending a purchase request message from the consumer to the merchant that includes an order description;

sending an authorization request message from the merchant to an acquirer gateway that includes the digital good encryption key and an indication that the transaction is a transaction for the digital good; and sending a verify customer data message to the consumer containing the digital good encryption key wherein the digital good encryption key is included in a CompletionCode field of the verify customer data message.

24. A fault-tolerant method of purchasing a digital good compatible with the SET protocol and protocols derived from or compatible to the SET protocol in a transaction comprising steps of:

sending to a merchant from a consumer a request for delivery of the digital good at a price;

sending from the merchant to the consumer a merchant-signed invoice and the digital good encrypted under a digital good encryption key;

sending a purchase request message from the consumer to the merchant that includes an order description;

sending an authorization request message from the merchant to an acquirer gateway that includes the digital good encryption key and an indication that the transaction is a transaction for the digital good;

sending a message to the consumer containing the digital good encryption key;

retaining records for dispute resolution that include the order description signed by both the consumer and the merchant, a hash of the encrypted digital good and a copy of the digital good encryption key at an entity for maintaining records the entity for maintaining records, including one of the acquirer gateway and an agent for the acquirer gateway; and sending a digital good encryption key request message from the consumer to the entity for maintaining records, wherein the digital good encryption key request message is a certificate request message in the Secure Electronic Transactions (SET) protocol with a special field indicating a digital good encryption key request.

25. A fault-tolerant method of purchasing a digital good compatible with the SET protocol and protocols derived from or compatible to the SET protocol in a transaction comprising steps of:

sending to a merchant from a consumer a request for delivery of the digital good at a price;

sending from the merchant to the consumer a merchant-signed invoice and the digital good encrypted under a digital good encryption key;

sending a purchase request message from the consumer to the merchant that includes an order description;

sending an authorization request message from the merchant to an acquirer gateway that includes the digital good encryption key and an indication that the transaction is a transaction for the digital good;

sending a message to the consumer containing the digital good encryption key;

retaining records for dispute resolution that include the order description signed by both the consumer and the merchant, a hash of the encrypted digital good and a copy of the digital good encryption key at an entity for maintaining records the entity for maintaining records, including one of the acquirer gateway and an agent for the acquirer gateway; and sending a digital good encryption key request message from the consumer to the entity for maintaining records;

sending to the consumer, in response to a digital good encryption key request message, a key response message containing the digital good encryption key supplied by the merchant and identified as the digital good encryption key used to encrypt the digital good, wherein the key response message is a certificate response message in the Secure Electronic Transactions (SET) protocol with a special field containing the digital good encryption key.

26. A fault-tolerant method of purchasing a digital good compatible with the SET protocol and protocols derived from or compatible to the SET protocol in a transaction comprising steps of:

sending to a merchant from a consumer a request for deliver of the digital good at a price;

sending from the merchant to the consumer a merchant-signed invoice and the digital good encrypted under a digital good encryption key;

sending a purchase request message from the consumer to the merchant that includes an order description;

sending an authorization request message from the merchant to an acquirer gateway that includes the digital good encryption key and an indication that the transaction is a transaction for the digital good;

sending a message to the consumer containing the digital good encryption key;

sending a capture request message from the merchant to the acquirer gateway; and sending a capture response message from the acquirer gateway to the merchant, wherein the key used to encrypt the digital good is contained in the capture response message.

27. The method of claim 26 wherein the digital good encryption key is contained in a capture identifier field of the capture response message.

* * * * *